United States Patent
Hultholm et al.

(10) Patent No.: US 7,547,348 B2
(45) Date of Patent: Jun. 16, 2009

(54) METHOD FOR THE RECOVERY OF METALS USING CHLORIDE LEACHING AND EXTRACTION

(75) Inventors: Stig-Erik Hultholm, Pori (FI); Olli Hyvärinen, Pori (FI)

(73) Assignee: Outotec OYJ, Espoo (FI)

( * ) Notice: Subject to any disclaimer, the term of this patent is extended or adjusted under 35 U.S.C. 154(b) by 555 days.

(21) Appl. No.: 10/531,363

(22) PCT Filed: Sep. 30, 2003

(86) PCT No.: PCT/FI03/00708

§ 371 (c)(1),
(2), (4) Date: Apr. 14, 2005

(87) PCT Pub. No.: WO2004/035840

PCT Pub. Date: Apr. 29, 2004

(65) Prior Publication Data
US 2006/0011014 A1  Jan. 19, 2006

(30) Foreign Application Priority Data
Oct. 15, 2002  (FI) .................................. 20021827

(51) Int. Cl.
*C22B 3/10* (2006.01)
(52) U.S. Cl. .............................. 75/744; 75/739; 75/741
(58) Field of Classification Search .................. 75/744, 75/726, 728, 732, 740; 423/24, 38
See application file for complete search history.

(56) References Cited

U.S. PATENT DOCUMENTS

| | | | | | |
|---|---|---|---|---|---|
| 3,476,553 | A | * | 11/1969 | Ray et al. ..................... | 75/429 |
| 4,023,964 | A | | 5/1977 | DeMarthe et al. ........... | 205/605 |
| 4,082,629 | A | * | 4/1978 | Milner et al. ................ | 205/369 |
| 4,230,487 | A | * | 10/1980 | Demarthe et al. ............. | 75/420 |
| 4,272,492 | A | * | 6/1981 | Jensen .......................... | 423/24 |
| 4,594,132 | A | * | 6/1986 | Satchell et al. .............. | 205/581 |
| 5,230,786 | A | * | 7/1993 | Preidel ........................ | 204/435 |
| 6,007,600 | A | | 12/1999 | Hyvarinen et al. ............ | 75/740 |
| 7,065,857 | B2 | * | 6/2006 | Watanabe et al. .......... | 29/592.1 |

OTHER PUBLICATIONS

Derwent World Patent Index, Week 197442 "Leaching metals from fine sulphide particles-contg. At least two of nickel copper and precious metals"; AN 1974-72838V & BE 815657, Sep. 16, 1974 Abstract.

\* cited by examiner

*Primary Examiner*—George Wyszomierski
*Assistant Examiner*—Tima M McGuthry-Banks
(74) *Attorney, Agent, or Firm*—Buchanan Ingersoll & Rooney PC

(57) ABSTRACT

The invention relates to a method for the recovery of metals, in particular copper, from a copper-bearing raw material, whereby the material is leached into a chloride-containing solution. The leaching of the raw material is performed oxidatively and at a sufficiently high redox potential that the copper in the copper chloride solution from leaching is mainly divalent. The chloride solution obtained, which contains copper and potentially other valuable metals, is fed to liquid-liquid extraction. In the extraction the copper is first transferred to the organic phase with extraction and then to a sulphate solution in stripping, which is fed to copper electrowinning.

11 Claims, 1 Drawing Sheet

METHOD FOR THE RECOVERY OF METALS USING CHLORIDE LEACHING AND EXTRACTION

Figure 1:
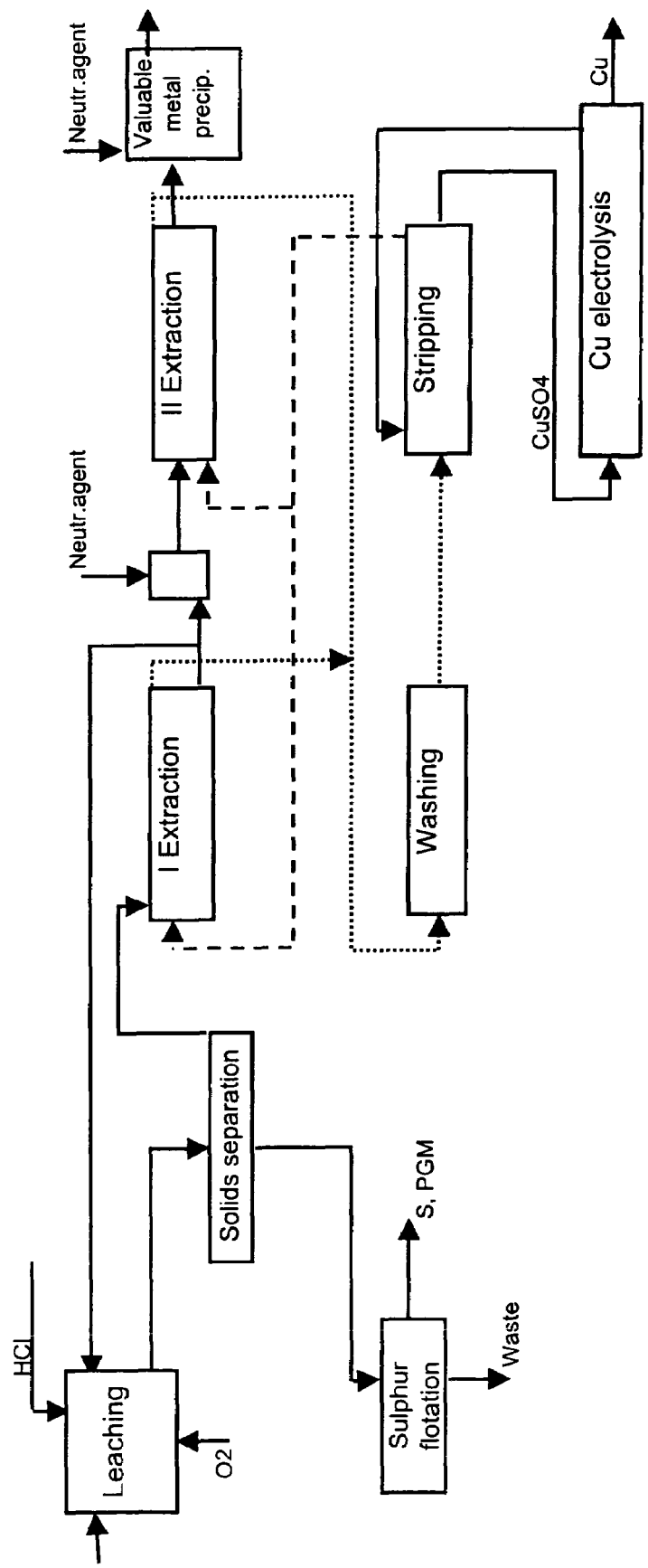

The method relates to the recovery of metals, in particular copper, from a copper-bearing raw material, whereby the material is leached into a chloride-containing solution. The leaching of the raw material is performed oxidatively and at a sufficiently high redox potential that the copper in the copper chloride solution from leaching is mainly divalent. The chloride solution obtained, which contains copper and potentially other valuable metals, is routed to liquid-liquid extraction. In extraction the copper is first transferred to the organic phase with extraction and then to a sulphate solution in stripping, which is routed to copper electrowinning.

U.S. Pat. No. 6,007,600 describes a method for the hydrometallurgical production of copper from copper-bearing raw materials such as copper sulphide concentrate. According to the method the raw material is leached counter-currently with a strong sodium chloride-copper (II) chloride solution in several stages to form a monovalent copper chloride solution. During leaching iron and sulphur are precipitated out of the solution. The purified cuprous chloride solution is precipitated with suitable reagents as copper oxidule and the oxidule is reduced further to elemental copper.

In U.S. Pat. No. 6,007,600, the leaching of copper concentrate is performed in conditions where iron is precipitated from the solution during leaching, but it is characteristic of the leaching methods that the largest possible amount of copper is taken into the chloride solution in monovalent form.

U.S. Pat. No. 4,023,964 describes a method for the fabrication of electrolytic copper. In this method the copper sulphide concentrate is leached into a copper(II) chloride—sodium chloride solution. The NaCl content of the solution is 100-300 g/l and the pH a maximum of 1, whereby the iron dissolves. The solution obtained is divided into two parts, from one of which iron is precipitated as goethite and the cupric chloride solution formed during precipitation is routed back to concentrate leaching. The other part of the solution is brought into contact with an extraction solution, and at the same time air is fed into the solution to oxidize the monovalent copper into divalent. In extraction copper binds itself to the organic phase and the copper-depleted chloride solution is fed back to concentrate leaching. In stripping the organic phase and the copper bound to it is brought into contact with an aqueous solution of sulphuric acid. The copper sulphate solution thus formed is routed to elemental copper production and the organic phase is recirculated back to the extraction stage.

The method described in U.S. Pat. No. 4,023,964 is practicable in that the copper sulphide concentrate is leached as chloride, which is routed to liquid-liquid extraction and the copper is recovered from extraction as copper sulphate solution. The further processing of copper sulphate solution in electrowinning for instance is a well-known technique and produces pure copper. The weakness of this method however, is the concentrate leaching, which takes place in conditions where iron also dissolves and the iron has to be precipitated out of the solution as a separate stage. At the same time the copper in the copper chloride solution from leaching is mainly monovalent, so it must be oxidized separately during extraction. When oxidation occurs during extraction, there is a great risk that the extractant will also oxidize at the same time and will no longer be fit for use. It is recommended in this method that extraction be carried out at a temperature of 60° C., which in practice is far too high and causes the destruction of the extractant.

Now a method has been developed for the recovery of metals, in particular copper, from copper-bearing raw materials that also contain iron and sulphur. According to this method a chloride-based oxidizing leach is performed on copper-bearing material countercurrently in conditions where the iron in the concentrate is precipitated and the sulphur is also recovered as elemental sulphur to a deposit. If the raw material contains gold and/or platinum metals (PGM), they are made to precipitate with the sulphur and are recovered from the sulphur deposit. Hereafter the term precious metal will be used to refer to gold and/or platinum metals (PGM). The copper in the copper chloride solution obtained from leaching is mainly divalent. Copper is obtained into the solution in divalent form by leaching copper-bearing material at a sufficiently high redox potential in a solution of the oxidizing substance, divalent copper and hydrochloric acid, where the dissolved copper remains divalent and can be fed directly to extraction without an oxidation stage. The redox potential is preferably in the range of 480-500 mV measured with an Ag/AgCl electrode. It is recommended to perform extraction at a temperature of maximum 40° C. Copper is stripped from the organic solution into an aqueous solution of sulphuric acid, which is fed to an electrolysis for recovery as elemental copper.

The essential features of the invention will be made apparent in the attached claims.

The copper-bearing material may be for example a copper sulphidic concentrate, which usually contains other valuable metals in addition to copper. In the text of the invention the term valuable metals is used, referring mainly to nickel, cobalt and zinc. During leaching the other valuable metals also dissolve. Thus, the resulting aqueous solution contains copper mainly as divalent cupric chloride as well as the other valuable metals. Since the known copper extractants are chiefly selective as regards divalent copper, the cupric chloride solution can be fed directly to extraction without an oxidation stage.

The method according to the invention is further illustrated by FIG. 1, which shows a flowsheet of one preferred embodiment of the invention.

The copper-bearing raw material is fed to the leaching stage, where leaching is performed with a copper chloride-hydrochloric acid solution. Leaching generally occurs in practice as a multi-stage process but for the sake of simplicity the flowsheet shows it as a single stage. The redox potential of the leach is adjusted to the range of 480-500 mV vs. Ag/AgCl using the feed of an oxidizing agent. The oxidizing agent may be oxygen or air. The slurry obtained from leaching is fed to separation of solids and solution. The cupric chloride solution coming from the separation is fed to an extraction and the deposit to sulphur flotation.

In the extraction the aqueous solution of cupric chloride is brought into contact with an organic extractant and copper is made to transfer to the organic phase. The extraction stage comprises the normal mixing and settling section, although these are not shown in detail in the diagram. The extraction shown in the flowsheet is performed in two stages, but depending on the conditions the extraction can also be carried out in a single stage. In the diagram, the aqueous solution is marked with a solid line and the organic solution with a broken line. The temperature of the extraction stages is a maximum of 40° C.

One part of the chloride-containing aqueous solution from the first extraction stage, the raffinate, which has been depleted of copper and has an increased acid content, is fed back to raw material leaching. The rest of the aqueous solution, which is fed to the second extraction stage, is neutralized before this stage. The recovery of the other valuable metals is carried out from the aqueous solution, which is removed from the second extraction stage. The organic solution exiting the extraction stages is fed via washing to a stripping. In the stripping, the organic solution that contains the divalent copper ion is brought into contact with an aqueous solution of sulphuric acid and the copper is transferred to the aqueous phase as sulphate, from which it is recovered by an electrolysis. When copper recovery occurs in copper electrowinning, the return acid from electrowinning can be used as the aqueous solution of sulphuric acid in the stripping.

Any known copper extractant is suitable as extractant, such as oximes, which are diluted in a suitable solvent, e.g. kerosene. When extraction is performed in two stages, a maximum of half the copper is extracted in the first stage. The copper content of the raffinate from the first stage has fallen and at the same time its hydrochloric acid content has increased in accordance with the following reaction:

$$CuCl_2 + 2HR \rightarrow CuR_2 + 2HCl \quad (1)$$

In the reaction R means the hydrocarbon part of the extractant, which forms a complex with copper in the organic solution while the hydrogen ion part forms hydrochloric acid with the chloride in the aqueous solution.

Most of the raffinate from the first extraction stage is recirculated back to the copper-bearing raw material leaching. However some of it is routed to a neutralization, where the hydrochloric acid generated in the first extraction phase is neutralized using alkali hydroxide. Sodium hydroxide NaOH or lime $CaCO_3$ for instance may be used as the alkali hydroxide.

The neutralized aqueous solution of cupric chloride is fed to the second extraction stage, where the copper is extracted from the aqueous solution as carefully as possible. The organic solution is fed to the both extraction stages from the stripping stage i.e. the stages operate in parallel connection with respect to the organic solution feed. When extraction has been performed, the extraction solutions from both stages are joined and fed to the stripping via a washing stage. Stripping is carried out using a sulphate-containing aqueous solution such as the return acid from the copper electrowinning.

The aqueous solution from the second extraction stage i.e. the second raffinate, is routed to further processing, where the other valuable metals contained in the raw material are recovered from the solution, such as nickel, cobalt and zinc. The valuable metals are precipitated out of the solution using an alkali hydroxide. First the nickel is recovered from the formed deposit by reduction and afterwards the other metals contained in the raw material. Cobalt and nickel may also be recovered by selective liquid-liquid extraction after the copper extraction.

The raw material leaching is carried out at a high redox potential and a pH value of at least 1.5, whereby almost all of the iron is precipitated out. Sulphur is also precipitated in these conditions. If the raw material includes gold and platinum metals (PGM), these also remain in the deposit. Sulphur flotation is performed on the deposit, whereby a sulphur concentrate is obtained that also contains precious metals (gold+PGM). Sulphur is separated from the sulphur concentrate according to known methods and a PGM concentrate is obtained containing precious metals. The PGM content of the concentrate generated is so big that it can be marketed to plants specialized in the refining of platinum metals.

Two-stage extraction is advantageous particularly in cases where the raw material contains a considerable amount of nickel. If there is little nickel in the raw material, one-stage copper extraction may be carried out. In this case the aqueous solution exiting the extraction, the raffinate, is pumped straight back to leaching. Co-precipitation of the valuable substances in the solution is performed on only a small part of the raffinate or as much as needs dictate using for example lime, when the valuable metals content has risen so much that it starts to reduce the solubility of copper. After the hydroxide precipitation the calcium chloride solution is treated with sulphuric acid, whereby hydrochloric acid is obtained, which is fed back to raw material leaching.

The method now developed is also applicable to other materials than copper sulphide concentrates. The method described above applied to concentrates including precious metals, but also copper-nickel-cobalt-iron matte that contains gold and PGM can be processed advantageously with the method of this invention.

The method of the invention is described further by the following example.

EXAMPLE 1

A sulphidic concentrate with a composition of 12% Cu, 2.3% Ni, 23% Fe and 25% S as well as 120 ppm Pd and 14 ppm Au, was treated according to the method of the invention. The concentrate was leached at a temperature of 90° C. and a redox potential of 500 mV vs Ag/AgCl, which was maintained with oxygen blowing. The results show that nickel and copper leach very well into the solution and that only a small part of the sulphur is oxidized into sulphate. Precious metals start to dissolve only after the redox potential rises above 500 mV vs Ag/AgCl. The reaction speed is great and the reaction degree over 90% for copper and nickel in only six hours. The composition of the leach residue was: Cu 1.5%, Ni 0.1%, Fe 30%, S 24%. The Cu content of the feed solution was 41 g/l, the Ni content 26 g/l and the amount 2.28 l per kg of concentrate. In addition to this, 0.59 kg pure hydrochloric acid was added per kg of concentrate i.e. 1.48 l of 25% hydrochloric acid/kg concentrate. Leaching produced a solution with a Cu content of 59 g/l, a Ni content of 26 g/l and a quantity of 3.76 l/kg concentrate.

In the extraction about 30% of the copper is extracted in the first extraction stage without neutralization, after which main part of the solution is pumped back to the leaching. After the first extraction stage the Cu content of the aqueous solution was 41 g/l. A smaller amount of the aqueous solution from the first extraction stage, the proportion of which is determined by the nickel content, i.e. in this case about 40%, was routed to the second extraction stage. The sulphuric acid of the solution was neutralized with lye and the remaining copper extracted in the second extraction stage.

In the both extraction stages the temperature was held below 40° C. and direct contact between the lye and the organic phase was avoided. This minimizes the load on the extractant and extends its service life.

The organic phases form both extraction stages are combined and washed with dilute sulphuric acid water to remove the iron and chloride residue. The rinse solution is pumped to leaching. After washing the copper-containing organic solution is routed to stripping, where copper is stripped from the organic solution into the return acid from copper electrowinning. The stripped organic phase is returned to the extraction stages.

Copper electrowinning produced 120 g of super-pure cathode copper per kg of concentrate i.e. the same amount that was extracted and fed to the process as a concentrate. The raffinate from the second extraction stage, which contains nickel and cobalt as well as a little copper, is fed to hydroxide precipitation. Nickel, cobalt, copper and other metal cations are precipitated with lye. The amount of alkali lye required is 0.22 kg/kg concentrate, of which most is used in acid neutralization. 0.06 kg hydroxide deposit was produced per kg of concentrate. The composition of the hydroxide precipitate was Ni 60%, Cu 0.3%, Co 2.8%.

After filtration, the sulphate generated in leaching is removed from the saline solution using lime. After this the solution can be routed to final purification before chlor-alkali electrolysis. The chlorine and hydrogen generated in chlor-alkali electrolysis are burnt to form hydrochloric acid and fed to leaching. The quantity is 1.48 l of 25% hydrochloric acid/kg concentrate.

Leach residue is generated in the leaching, which contains the PGMs from the concentrate and most of the sulphidic sulphur as elemental sulphur, most of the iron as goethite or hematite, and the silicate minerals almost unchanged. The sulphur and PGMs are separated from the silicates and iron oxides by flotation. The sulphur concentrate obtained is treated first by separating the majority of the sulphur and further by leaching, so that the solutions are returned to the beginning of the process. The PGM concentrate, which has a composition of Pd 17%, Pt 4%, Au 2%, Cu 10%, Ni 2%, Fe 14%, is easy to sell for further refining or to process further into pure metal. The quantity is 0.7 g/kg concentrate.

The invention claimed is:

1. A method for recovery of copper from copper-bearing raw material further containing other valuable metals, iron, and sulphur, the method comprising:
   leaching said raw material into an aqueous solution of copper chloride and hydrochloric acid in a leaching stage;
   adjusting a redox potential of a copper-containing raw material leach in the leaching stage using a feed of an oxidizing agent to the range of 480-500 mV with regard to a Ag/AgCl electrode, whereby iron and sulphur remain in a deposit formed in leaching and the copper in the aqueous solution is mainly divalent;
   feeding the aqueous solution coming from the leaching stage to the first extraction stage of a two-stage liquid-liquid extraction stage;
   extracting, in the first extraction stage, copper from the aqueous solution coming from the leaching stage into a first organic extraction solution while the other valuable metals remain in the aqueous solution coming from the leaching stage;
   partitioning the aqueous solution coming from the first extraction stage into a first part and a second part;
   feeding the first part of the aqueous solution back to the leaching stage; neutralizing the second part of the aqueous solution;
   feeding the neutralized aqueous solution into the second extraction stage;
   extracting, in the second extraction stage, copper from the neutralized aqueous solution into a second organic extraction solution while the other valuable metals remain in the neutralized aqueous solution;
   transferring the first and second organic extraction solutions to a stripping stage where copper is transferred from the first and second organic extraction solutions into an aqueous solution of sulphuric acid forming a copper-depleted organic extraction solution;
   feeding the aqueous solution of sulphuric acid from the stripping stage to an electrowinning stage for recovery of elemental copper.

2. The method according to claim 1, wherein the oxidizing agent is oxygen.

3. The method according to claim 1, wherein the oxidizing agent is air.

4. The method according to claim 1, wherein the extraction temperature is less than or equal to about 40° C.

5. The method according to claim 1, wherein the aqueous solution of sulphuric acid fed to the stripping stage comprises a return acid from the copper electrowinning stage.

6. The method according to claim 1, further comprising precipitating the other valuable metals from the aqueous solution coming from the second extraction stage using alkali hydroxide precipitation.

7. The method according to claim 1, wherein the copper-bearing raw material comprises gold and/or platinum group metals.

8. The method according to claim 7, further comprising precipitating the gold and/or platinum group metals in connection with precipitation of sulphur and iron, the gold and/or platinum group metals being recovered from a precipitate deposit during a sulphur flotation stage.

9. The method according to claim 1, wherein a pH value in the leaching stage is at least 1.5.

10. The method according to claim 6, wherein the other valuable metals are selected from the group consisting of nickel, cobalt and zinc.

11. The method according to claim 6, further comprising treating the aqueous solution coming from the precipitation step with sulphuric acid whereby hydrochloric acid is obtained; and feeding the treated aqueous solution back to the leaching stage.

* * * * *